United States Patent [19]

Lama et al.

[11] Patent Number: 4,696,545
[45] Date of Patent: Sep. 29, 1987

[54] SHORT FOCAL LENGTH IMAGING DEVICE

[75] Inventors: William L. Lama; Michael E. Harrigan, both of Webster, N.Y.

[73] Assignee: Xerox Corporation, Stamford, Conn.

[21] Appl. No.: 765,748

[22] Filed: Aug. 15, 1985

[51] Int. Cl.[4] .................. G02B 27/00; G03B 27/00
[52] U.S. Cl. ............................... 350/167; 355/1
[58] Field of Search ................ 350/167; 355/1, 46

[56] References Cited

U.S. PATENT DOCUMENTS

| 3,584,950 | 6/1971 | Gundlach | 355/50 |
| 3,584,952 | 6/1971 | Gundlach et al. | 355/52 |
| 3,658,407 | 4/1972 | Kitano et al. | 350/96.31 X |
| 4,168,900 | 9/1979 | Adachi | 355/1 |
| 4,572,611 | 2/1986 | Bellman et al. | 350/167 |

FOREIGN PATENT DOCUMENTS 0133788  3/1985  European Pat. Off.

Primary Examiner—John K. Corbin
Assistant Examiner—D. Edmondson

[57] ABSTRACT

An imaging device is disclosed which comprises a noble metal photosensitive glass having formed on the surfaces a plurality of raised spherical surfaces which form an array of thick lenses. The array can be positioned between an object and image plane to project images from the object plane onto the image plane. Lens spherical aberrations are reduced and lens array imaging performance is optimized by an optimum lens aperture radius or an optimum lens numerical aperture.

1 Claim, 6 Drawing Figures

SHORT FOCAL LENGTH IMAGING DEVICE

This invention relates to an optical imaging device and, more particularly, to an optical imaging system of relatively short focal length used in an electrophotographic printing machine to record a flowing light image of a document onto a photosensitive surface.

The increasing use of compact, desk-type electrophotographic reproduction devices has, at least partially been enabled by the use of optical imaging systems having relatively short conjugate lengths. One example is the use of a lens strip as the image projection device. In this system, described in U.S. Pat. Nos. 3,584,950 and 3,584,952, three lens strip elements, each element containing a plurality of refracting lenslets are coaxially aligned to form a three-lens imaging device having a very short focal length. With this lens design, perfect alignment of the strip element to achieve a 1:1 erect imaging on a photosensitive surface has proven difficult to achieve. The design also requires additional optical baffles between lenses to eliminate cross-talk.

A second example of a short focal length imaging device is disclosed in U.S. Pat. No. 3,658,407. A plurality of gradient index optical fibers are bundled together to form a linear projection lens. This lens array, known as a SELFOC lens (mark registered in Japan and owned by Nippon Sheet Glass Co., Ltd.) has found use in a number of compact commercial reproduction devices. The manufacture of these lenses is a complex process requiring maintenance of close tolerances on the gradient distribution of each fiber.

A third example of a short focal length imaging system is disclosed in U.S. Pat. No. 4,168,900. This patent describes a reduction thick lens array which incorporates a first pair of array sets of object lenses and a second pair of array sets of relay lenses. The lens array requires precise alignment and spacing and is subject ot spherical aberrations.

As a final example, a microlens array is disclosed in European Patent Publication No. 133 788, published Mar. 6, 1985. The lens array disclosed therein comprises a specially manufactured soft glass which is exposed to collimated ultra-violet light through a mask. Small spherical lenses are formed at the raised surface of the glass body, creating an array of thick lenses that can function as an image focusing device. These devices however, are subject to spherical aberrations which, considerably degrade the image.

According to the present invention, there is disclosed a lens array design of the third type which has been optimized to be practically abberration-design of the third type which has been optimized to be practically abberation-free. More particularly, there is provided a short focal length imaging device for forming an erect 1:1 image of an object at an object plane on a photosensitive image plane, said device comprising an elongated, noble metal, photosensitive glass having formed on at least one surface a plurality of raised spherical lenses.

DESCRIPTION

Figure 1A:
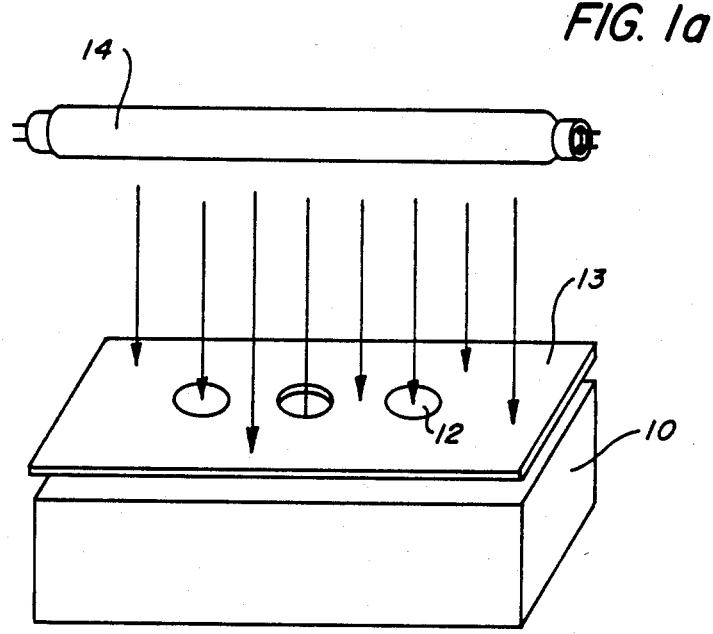
FIGS. 1a and 1b show a top perspective view and a side view respectively, of a homogeneous soft glass body being exposed to a collimated light source through an optical mask.
Figure 1B:
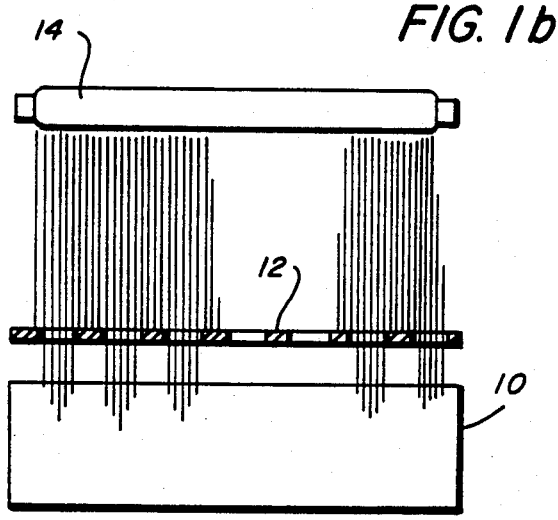
Figure 2A:
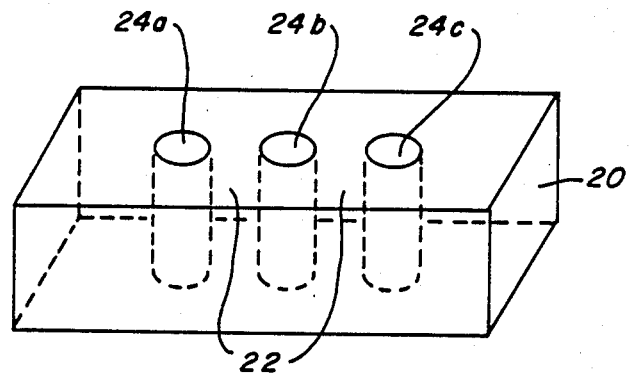
FIGS. 2a and 2b show a top perspective and a side view respectively, of the short focal length thick lens array formed after the exposure process.
Figure 2B:
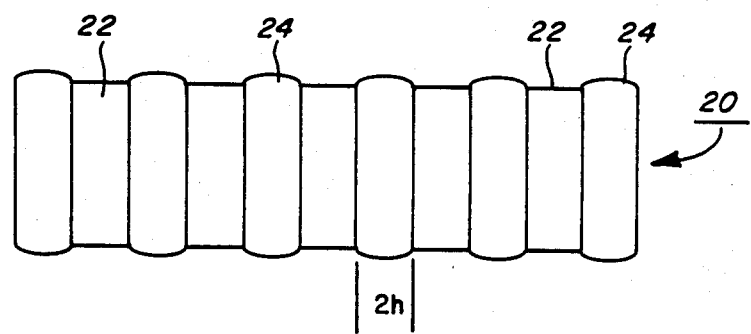

Referring now to FIG. 1, there is shown a technique for forming a spherical thick lens. FIG. 2 shows the resultant lens. Referring to FIGS. 1a; 1b, a homogeneous glass body 10 has its top and bottom surfaces exposed through photo masks 12, 13 by collimated light from elongated lamp 14. In an exemplary embodiment, glass body 10 is a noble metal photosensitive type having a general composition listed in the Table. Masks 12, 13 comprise a chrome pattern on a silica substrate with opaque disks 12 on a transparent background 13 and disposed in a hexagonal close-packed arrangement. Lamp 14 is a mercury UV lamp. The glass is exposed through the mask for an exposure time of between 120 and 600 seconds. The glass is also exposed through another mask on the other side, the two masks being properly aligned to form an array of thick lenses. The ultra-violet light component of the lamp causes stresses in the glass. These stresses are relieved by heat in a subsequent thermal cycle.

During the thermal cycle, the exposed region on the surface of glass body 10 densifies, developing stresses at the top and bottom surfaces which squeeze the unexposed cylindrical region of the glass, pushing these regions up beyond the surface. Surface tension then causes the raised regions to assume a spherical configuration. FIG. 2 thus shows the glass body 10, after this process, now transformed into a lens array 20 comprising a plurality of exposed segments 22 and unexposed segments (lenses 24). The radius (semi-aperture) of each lens element is h.

The lens array 20 can be formed so that when placed intermediate an object or image plane, it produces a unity magnification, erect image of an object at the object plane. The following formula governs this relationship:

$$t = \frac{T}{(n-1)cT - 2n} \quad (1)$$

where t is the 1:1 erect conjugate working distance, T the lens thickness, C is the curvature of each lens in the array and n the refractive index of the glass.

Figure 3:
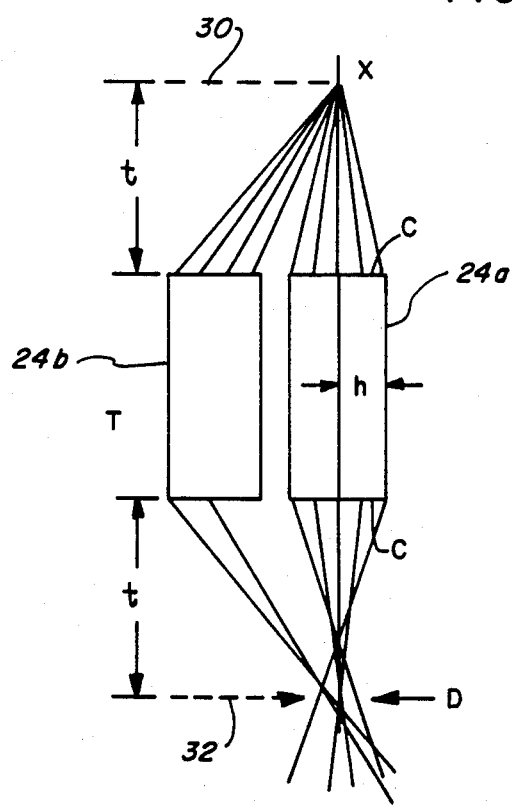
FIG. 3 is a side view of a pair of spherical lenses showing formation of an image at an image plane affected by spherical aberration.

A typical lens array, useful, for example, as an optical imaging device in a document reproduction machine would have lenses 24 of semi-aperture radius h=0.2 mm; center to center spacing of 0.24 mm with a lens thickness T of 6 mm. A typical object-to-image (platen to photoreceptor) distance TC would be 24 mm. These relationships are shown in FIG. 3 which illustrates two lenses 24a, 24b positioned between an object plane 30 and an image plane 32. Point object X at the object plane is viewed by the lenses and projected onto the image plane. The quality of this projected image is determined primarily by the spherical aberration of the lenses. In this case, the point object is projected as a blurred image spot having a diameter D.

Due to vignetting, the extreme rays from off-axis lens 24b fall within the spot produced by lens 24a. Thus the diameter D of the image spot may be obtained from the following formula:

$$D_{sph} = \frac{2nh^3t}{(n-1)^2}\left(\frac{1}{t}+\frac{2}{T}\right)^2\left(\frac{n}{t}+\frac{2}{T}\right) \quad (2)$$

Equation (2) is a third order Seidel estimate of spherical aberration, which should be reliable for lens aperture radii up to h=1 mm. For the typical thick lens parameters (h≈0.2 mm, t≈10 mm), Equation (2) has been verified by computer ray trace studies. Equation (2) determines the image quality of lens array 20 in those cases where the stray light is very low and where the off-axis aberrations are sufficiently reduced by vignetting so that the major aberration is axial spherical, as illustrated in FIG. 3.

For a given t, Equation (2) shows that the blur diameter $D_{sph}$ grows with the cube of the lens semiaperture h. Thus, to improve the resolution, h should be reduced. For example, for n=1.52, h=0.22 mm, t=8 mm, T=6 mm, Equation (2) gives $D_{sph}$=0.106 mm. By reducing h from 0.20 to 0.15 mm the blur diameter decreases from 0.106 to 0.033 mm, an improvement of better than a factor of three. However, reducing h (for given t) increases the size of the blur due to diffraction, which is given by $$D_{diff} = \frac{1.22\lambda t}{h} \quad (3)$$

where λ is the optical wavelength. Thus, if the lens semi-aperture is reduced too far, the diffraction spot will exceed the spot due to spherical aberration. An optimum lens semi-aperture that produces the minimum blur is that for which the diffraction spot (3) equals the spherical aberration spot (2). Thus, by equating (2) and (3), and according to a first aspect of the present invention, an optimum lens semi-aperture radius is expressed by $$h_{opt} = \left[\frac{0.61\lambda(n-1)^2/n}{\left(\frac{1}{t}+\frac{2}{T}\right)^2\left(\frac{n}{t}+\frac{2}{T}\right)}\right]^{\frac{1}{4}} \quad (4)$$

For λ=0.55 micron, n=1.52, T=6 mm and t=8 mm, Equation (4) yields $h_{opt}$=0.15 mm and the blur diameter is 0.033 mm. For a smaller lens semi-aperture, diffraction will produce a larger blur while for a larger semi-aperture, spherical aberration will increase the blur. The lens array image quality is optimized by the lens semi-aperture given by Equation (4).

If the vertex distance t is a variable parameter, then Equation (4) may be used to show that there is an optimum t given by $$t_{opt} = \frac{T}{4}[1+\sqrt{1+8n}\,] \quad (5)$$

For n=1.52 and T=6, the optimum vertex distance is $t_{opt}$=6.9 mm.

Figure 4:
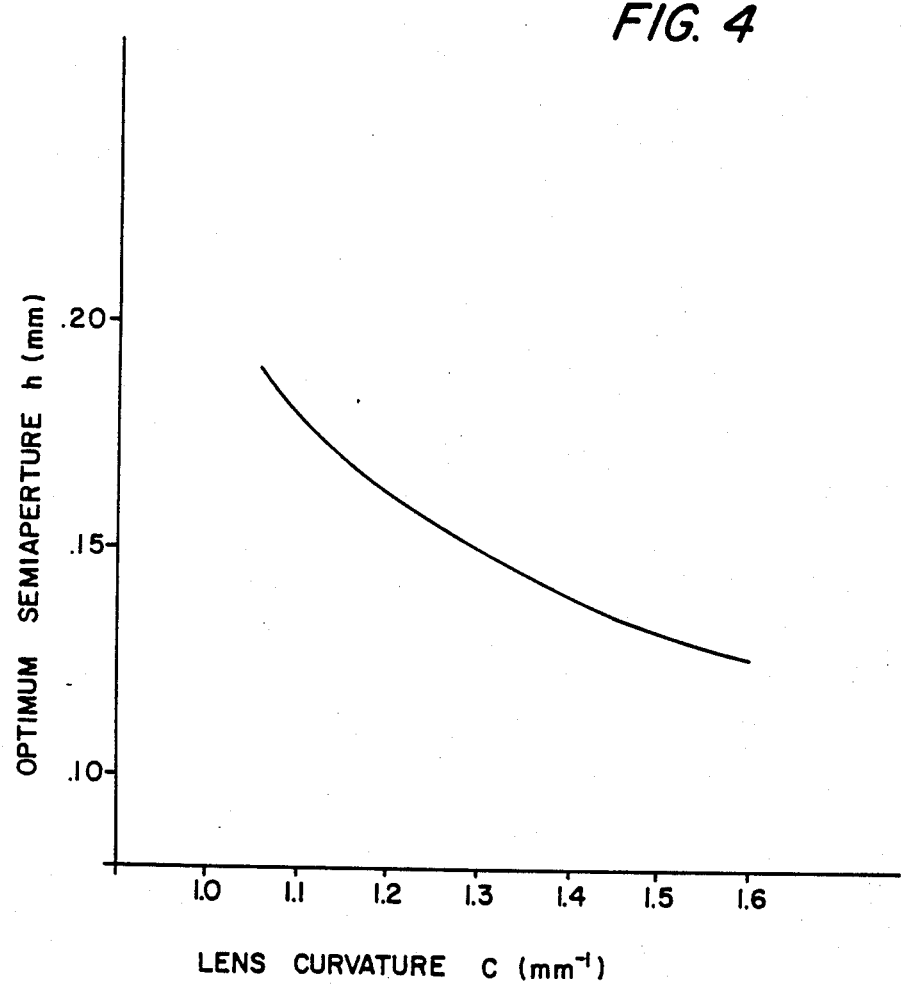
FIG. 4 is a plot of lens curvature C vs. optimum semi-aperture h.

Note that Equation (1) can be inserted into Equation (4) to obtain an equation relating the optimum semi-aperture, $h_{opt}$, to the lens parameters (n, T and C); $h_{opt}$ is plotted vs C in FIG. 4, for the parameter set: λ=0.55 micron, n=1.52 and T=6 mm.

In conventional lens optimization, it is customary to fix the numerical aperture of the lens; thus $U=h/t$ is a constant. If we make this a condition, then Equation (2) may be usefully rewritten as follows:

$$D_{sph} = \frac{2ntU^3}{(n-1)^2}\left(1+\frac{2t}{T}\right)^2\left(n+\frac{2t}{T}\right) \quad (6)$$

Equation (6) shows that with U and t fixed, a thick lens (large T) is better than a thin lens. Furthermore, Equation (6) may be combined, according to a second principle of the present invention, with Equation (3) to derive the optimum numerical aperture $$U_{opt} = \left[\frac{0.61\lambda(n-1)^2/n}{t\left(1+\frac{2t}{T}\right)^2\left(n+\frac{2t}{T}\right)}\right]^{\frac{1}{4}} \quad (7)$$

which yields the minimum blur diameter $$D_{min} = 1.22\,\lambda/U_{opt} \quad (8)$$

For a given lens radius, the size of the object field of view increases with the vertex distance. Thus, for larger t, more lenses will contribute to the image of a given object point. For large enough t, the blur produced by far-off-axis lenses may exceed the blur due to the axial lens. Thus, for large t the field height $$k = \frac{2nht}{T} \quad (9)$$

should be reduced by reducing h or increasing T.

In summary, design equations for thick lens array have been derived which optimize the image quality. For relatively short total conjugates (<25 mm), the optimum lens semi-aperture is given by Equation (4) and the optimum numerical aperture by Equation (7). There is also an optimum vertex distance given by Equation (5).

For longer conjugates the blur grows proportional to t, but still there is an optimum semi-aperture for any t. For example, the optimum semi-aperture is 0.19 mm for t=25 mm. However, for these conjugates the off-axis aberrations are probably not reduced enough (by vignetting) to be ignored. Thus, the blur will be further increased due to the extra lenses contributing to the image at longer conjugates. This effect may be reduced by a reduction in the field height k by increasing T or decreasing h.

TABLE

| Glass Composition | Range Wt. % |
| --- | --- |
| SiO | 75–85 |
| Li$_2$O | 7–11 |
| Na$_2$O | 1–2 |
| K$_2$O | 3–6 |
| Al$_2$O$_3$ | 3–6 |
| ZnO | 0–2 |
| Ce$_2$O$_3$ | 0.015 |
| Sb$_2$O$_3$ | 0.30 |
| Ag | 0.10 |

What is claimed is:

1. A short focal length imaging device for forming an erect 1:1 image of an object at an object plane on a photosensitive image plane, said device comprising a noble metal photosensitive glass having formed on the surfaces a plurality of raised spherical lenses, said imaging device having a vertex distance t defined by the expression:

$$t = \frac{T}{(n-1)cT - 2n}$$

where T is the device thickness, n is the refractive index of the glass and c is the curvature of each lens of the array and wherein the aperture of each lens of the array has an optimum radius $h_{opt}$ given by $$h_{opt} = \left[ \frac{0.61\lambda(n-1)^2/n}{\left(\frac{1}{t} + \frac{2}{T}\right)^2 \left(\frac{n}{t} + \frac{2}{T}\right)} \right]^{\frac{1}{4}}$$

where $\lambda$ is the optical wavelength.

* * * * *